United States Patent [19]

Mason

[11] Patent Number: 5,085,838
[45] Date of Patent: Feb. 4, 1992

[54] THERMAL MODIFICATION OF ASBESTOS

[75] Inventor: Glenn M. Mason, Laramie, Wyo.

[73] Assignee: Western Research Institute, Laramie, Wyo.

[21] Appl. No.: 554,488

[22] Filed: Jul. 19, 1990

Related U.S. Application Data

[63] Continuation-in-part of Ser. No. 356,893, May 25, 1989, abandoned.

[51] Int. Cl.$^5$ .......................... C01B 33/24; B09B 3/00; A62D 3/00
[52] U.S. Cl. .................................... 423/167; 423/331; 423/334; 423/659; 423/DIG. 20
[58] Field of Search ............... 423/155, 167, 331, 334, 423/335, 659, DIG. 20

[56] References Cited

U.S. PATENT DOCUMENTS

| | | | |
|---|---|---|---|
| 1,067,542 | 7/1913 | Pater | 423/331 |
| 1,256,296 | 2/1918 | Chalton | 423/331 |
| 2,616,801 | 11/1952 | Badollet | 423/167 |
| 3,215,494 | 11/1965 | Hemstock | 423/167 |
| 3,914,184 | 10/1975 | Harada et al. | 423/635 |
| 4,287,167 | 9/1981 | Aitcin | 423/331 |
| 4,320,022 | 3/1982 | Aitcin | 501/112 |
| 4,476,235 | 10/1984 | Chevalier-Bultel et al. | 501/127 |
| 4,478,796 | 10/1984 | Lalancette | 423/332 |
| 4,479,828 | 10/1984 | Lalancette et al. | 106/466 |
| 4,798,717 | 1/1989 | Morency | 423/331 |
| 4,820,328 | 4/1989 | Roberts et al. | 501/155 |

Primary Examiner—Gary P. Straub
Attorney, Agent, or Firm—John O. Mingle

[57] ABSTRACT

A process is provided for converting asbestoform material into an environmentally safe material by heating the asbestoform material with an alkaline flux so as to change the crystalline structure of the asbestoform material to a form that is environmentally safe.

6 Claims, 2 Drawing Sheets

X-RAY DIFFRACTION OF CRYSTALLINE
STRUCTURE BEFORE AND AFTER PROCESS

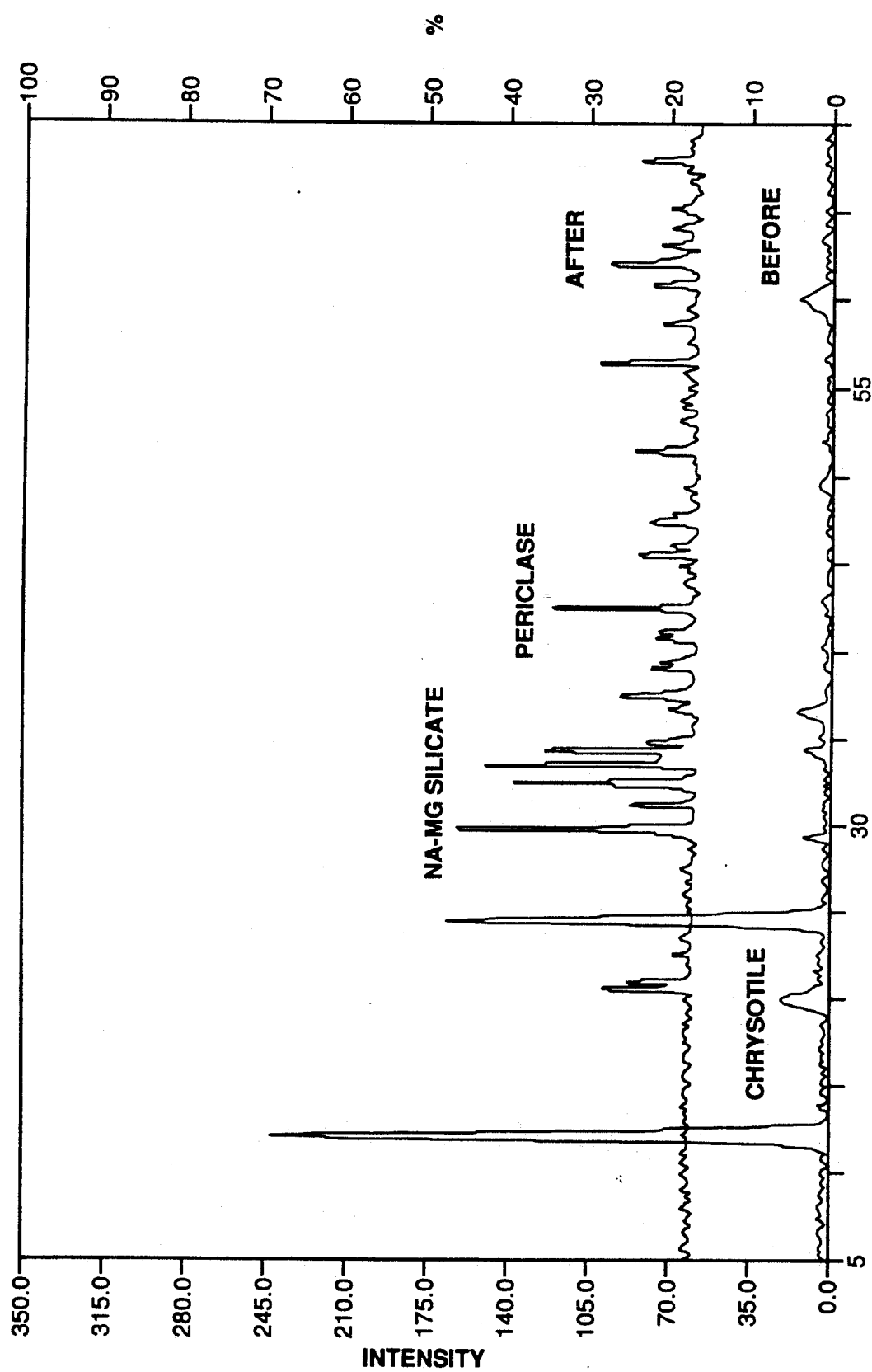
Fig. 1 X-RAY DIFFRACTION OF CRYSTALLINE STRUCTURE BEFORE AND AFTER PROCESS

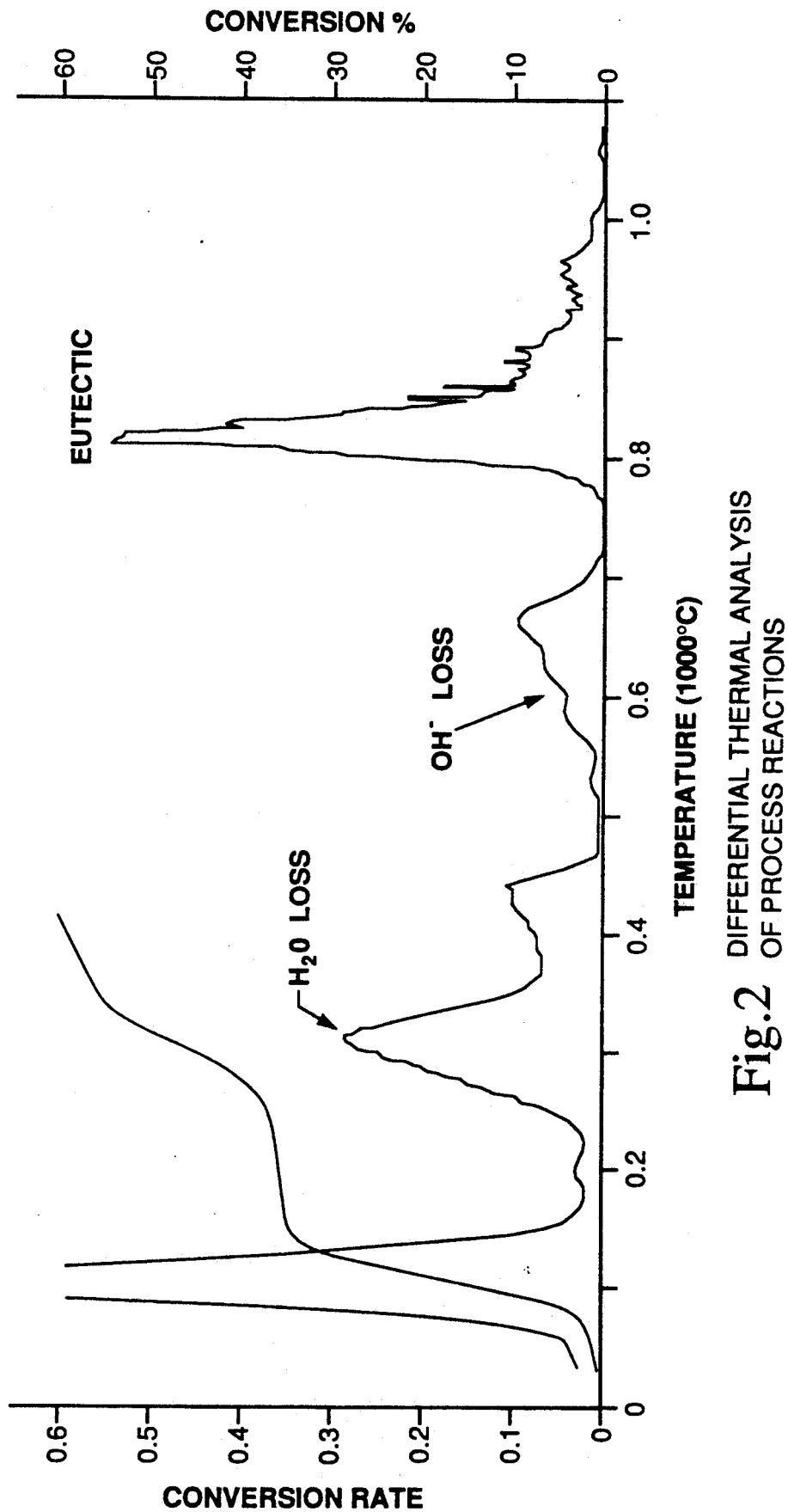
Fig. 2 DIFFERENTIAL THERMAL ANALYSIS OF PROCESS REACTIONS

THERMAL MODIFICATION OF ASBESTOS

This application is a continuation-in-part of Ser. No. 07/356,893, filed May 25, 1989, now abandoned, the entire contents of which are hereby incorporated by reference.

FIELD OF THE INVENTION

The present invention relates to a process for thermally modifying asbestos so that the asbestos no longer presents an environmental hazard.

BACKGROUND OF THE INVENTION

Asbestos is a commercial term applied to several minerals which are widely utilized, primarily because of their fibrous characteristics. All asbestos minerals consist of partially open bundles of very fine fibers, and most single fibers have a channel in the center. The principal asbestos minerals are chrysolite, crocidolite, amosite, and anthophyllite. Because they differ in chemical and physical properties, these minerals have different commercial applications.

Asbestos is "manufactured" by mining the ore deposits and separating the fibers from the non-asbestos rock. Some of the asbestos mines in the United States are located in California and Vermont. A number of other mines were closed in the 1970's.

Chrysolite is the serpentine variety of asbestos fiber. Chrysolite fibers occur in a wide variety of shapes. The idealized empirical composition of chrysolite is $Mg_3(Si_2O_5)(OH)_4$. Variations in chemical analyses may be due to either associated mineral impurities or to isomorphic substitutions in the crystal lattice. Chrysolite, a hydrated silicate, is subject to thermal decompositions at elevated temperatures. This thermal decomposition is a two-stage reaction, consisting first of a dehydroxylation phase, and then a structure phase change. Dehydroxylation or the loss of water occurs at 600°–780° C. At 800°–850° C., the anhydride breaks down to forsterite and silica. These reactions are irreversible.

Because of its hydroxyl outer layer, chrysolite is readily attacked by acid and will, ultimately, completely dissolve the magnesium components, leaving essentially a fibrous but fragile silica structure. Similarly, because of its alkaline surface, chrysolite is not readily attacked by caustic solutions except under conditions of extreme alkali concentration and elevated temperatures. Chrysolite forms of asbestos comprise about 95% of the world's production.

All varieties of asbestos other than chrysolite belong to the amphibole group of minerals and are generically termed amphibole asbestos. The amphibole asbestos consists of two chains or ribbons based on $Si_2O_{11}$ units separated by a band of cations. Seven cations form the basal unit. Two hydroxyl groups are attached to the central cation in each unit cell. These hydroxyls, unlike the chrysolite structure, are contained entirely within the amphibole structure. The final structure is composed of stacks of these sandwich ribbons. The bonding between these ribbons is rather weak, and the crystals are easily cleaved parallel to the ribbons along a cleavage line. If the cleavage is very facile, the result is an asbestoform mineral.

Amphiboles can also occur in nonfibrous forms which may result because of structural disorder. The dominant cations are $Mg^{2+}$, $Fe^{2+}$, $Fe^{3+}$, $Na^{30}$, and $Ca^{2+}$. Minor isomorphic substitutions of $Al^{3+}$, $Ti^{4+}$, $K^+$, and $Li^+$, also occur.

Like chrysolite, the amphibole asbestos fibers dehydroxylate and decompose at elevated temperatures. The presence of large quantities of iron makes the decompositions or thermal analysis determinations particularly complex and very dependent on the composition of the atmosphere.

The empirical compositions of crocidolite is $Na_6Fe_{10}Si_{16}O_{46}(OH)_2$. Crocidolite is the fibrous form of the mineral reibeckite. Crocidolite fibers, having an elliptical or circular cross section, are flexible and stronger than those of chrysolite.

The empirical formula of amosite, a yellowish-grayish white variety of asbestos found only in Transvaal, South Africa, is $(FeMg)_7Si_6O_{22}(OH)_2$. Amosite fibers, which exhibit a rectangular section, are harsher and ordinarily slightly weaker than those of chrysolite. Amosite fiber lengths extend to 10–11 inches.

The empirical formula of anthophyllite is $Mg_7Si_2O_{22}(OH)_2$. If unexposed to the atmosphere, anthophyllite is a greenish-gray color. On being exposed to the atmosphere, however, it yields brownish-white fibers that are short and weak and are only slightly flexible. Anthophyllite is found in Georgia and North Carolina in the United States and also in Finland.

Because of their physical and chemical properties, the asbestos minerals are extremely useful materials, and are presently used in more than two thousand applications, including fireproof textiles, brake linings, thermal insulation, asbestos cement pipe, asbestos cement sheets, paper products, gaskets, woven fabrics, high temperature insulation, chemical-resistant filters, and filler material.

Recently discovered evidence indicates, however, that introduction of asbestos into living organisms increases the organisms' risks of developing various chronic diseases, including lung cancer, chronic fibrosing processes in the lungs, and mesothelioma of the lungs or intestines. The gravity of this evidence is underscored by the widespread applications of asbestos and the resulting frequent exposures of living organisms thereto.

Although it is not clear what happens when asbestos enters a cell, it is postulated that entrance of asbestos into living cells results in formation of ferruginous bodies, iron-containing protein bodies with a fibrous core thought to be formed by macrophage cells attempting to phagocytize a foreign fiber.

Ferruginous bodies formed in living organisms appear to occur in various shapes and sizes, including evenly distributed deposits, series of clump-like deposits, and large barbell-shaped deposits. Although sizes vary, the fiber core approximates the lengths and diameters of asbestos and other fibers found in living organisms.

It is further theorized that formation of a ferruginous body in a living cell occurs by depositions of ferritin, a crystalline iron-containing protein and/or hemosiderin, a yellowish-brown granular pigment formed by the breakdown of hemoglobin and composed essentially of ferric oxide, on an electronegative surface, such as the nucleophilic silicates present in asbestos fibers. The formation of ferruginous bodies in a living organisms appears to set in motion a collagen synthesis ultimately resulting in chronic fibrosis and a potential for developing carcinoma.

A number of prior art workers have sought to treat asbestos so that it is no longer an environmental hazard, with a variety of successes.

Roberts et al., in U.S. Pat. No. 4,678,493, disclose a method for vitrification of asbestos waste to render the asbestos inert. The asbestos is introduced into a body of molten glass at a temperature above the decomposition temperature of asbestos, along with a melt accelerator which may be an alkali metal compound, an alkaline earth metal compound, a fluoride, a chloride, or a slag such as blast furnace slag. The melt accelerator causes the asbestos to dissolve completely in the glass to produce a homogeneous glass. The crystalline structure of the asbestos does not appear to be changed, the asbestos merely forming a homogeneous mixture with the glass. The composition may contain up to about 80% asbestos.

Richter, in U.S. Pat. No. 4,808,198, discloses a method for rendering asbestos wastes harmless by altering the physical form of the fibers by melting the asbestos and by incorporating the molten asbestos into the slag phase produced by the partial oxidation of ash-containing liquid hydrocarbonaceous fuel and/or solid carbonaceous fuel.

Karstetter, in U.S. Pat. No. 3,585,054, discloses a method for chemically altering at least a portion of the crystal phase in a glass-ceramic article containing oxides of magnesium, aluminum, and silicon in the crystal phase which comprises bringing the glass-ceramic article into contact with a material containing an exchangeable lithium ion to effect an exchange of magnesium and lithium ions and the consequent development of lithium aluminosilicate type crystal phases.

Flowers, in U.S. Pat. No. 4,328,197, discloses a method for treating asbestos and other silicate minerals to minimize their harmful properties by forming a metal-micelle silicate by contacting a silicate mineral with an aqueous solution of a weak base, strong acid, or strong base-weak acid salt of manganese, chromium, cobalt, iron, copper, aluminum, or mixtures thereof.

Ikeda et al., in U.S. Pat. No. 3,425,817, disclose a method for lowering the melting point of glass by using a low melting point glass of PbO, $B_2O_3$, and $TiO_3$ with a high melting point glass of $Al_2O_3$, $SiO_2$, and $Li_2O$.

Chevalier-Bulktel, in U.S. Pat. No. 4,476,235, disclose a green molded product for preparing shaped units comprising 55-99% by weight of non-calcined asbestos tailings, at least one of a heat-decomposable metal salt selected from the group consisting of sodium, potassium, lithium, calcium, barium, magnesium, aluminum, and mixtures thereof; a natural aluminum silicate; and mixtures of the above. The serpentine asbestos is said to decompose during the firing process, losing the water of crystallization at about 700° C. and being transformed into a ceramic body at about 800° C., forming forsterite and enstatite.

Pundsack et al., in U.S. Pat. No. 3,304,197, disclose a process for modifying the surface of asbestos by treating the asbestos surface to make it organophilic. This treatment is solely for the purpose of making the asbestos more dispersible as a filler in organic matrices.

Kroyer, in U.S. Pat. No. 3,073,708, discloses a number of fluxing agents which can be used to reduce the melting point of glasses.

Dumesnil et al., in U.S. Pat. No. 4,743,302, disclose a low melting mass made by incorporating bismuth oxide, zinc, barium, or strontium oxide; and phosphorus, niobium, or tantalum oxide to a lead-vanadium-oxide glass.

Natale, in U.S. Pat. No. 4,705,429, discloses a method for disposing of hazardous asbestos waste material comprising depositing the waste material containing asbestos in an open pit of an underground shaft mine. Soil or mining tailings may be used to cover the waste material.

Crossley, in U.S. Pat. No. Re 15,727, discloses a method of using waste asbestos by heating a mixture of asbestos and glass to a temperature below that at which the asbestos begins to effloresce to form a solid solution. The solid solution is raised to a higher temperature to form a glass.

SUMMARY OF THE INVENTION

It is an object of the present invention to overcome the aforementioned deficiencies in the prior art.

It is another object of the present invention to provide an environmentally safe method for disposing of asbestos.

It is a further object of the present invention to provide a method for rendering asbestos benign.

According to the present invention, asbestos materials are heated to high temperatures in the presence of an alkaline flux to cause the asbestos crystal structure to be transformed into a harmless and easily disposed of material. During the thermal processing of asbestos according to the present invention, sodium is substituted into the crystalline structure of the asbestos form materials, replacing some of the magnesium in the structure. The resulting crystal is a relatively harmless silicate mineral which does not have the fibrous crystalline habit which is responsible for asbestos being a health hazard.

According to the present invention, asbestos is contacted with an alkaline flux or reactant and heated to form about 750°-1000° C. The asbestos must be in substantially complete contact with the alkaline flux, i.e., the mixture of flux and asbestos must be such that the flux is in contact with substantially all of the asbestos to be treated. After approximately 0.2 to about five hours of treatment, depending upon the temperature and pressure conditions, the asbestos-flux mixture is cooled to form a glassy-appearing or crystalline material which has a different crystalline structure, commonly called a nesosilicate, from that of the original asbestos. Very rapid cooling favors the formation of a glassy-appearing material.

The alkaline flux used in the present invention is preferably trona, a sodium sesquicarbonate mineral. However, other alkaline fluxes can be used, including sodium borates, dolomite, fluorspar, and sodium phosphate.

BRIEF DESCRIPTION OF THE DRAWINGS

FIG. 1 shows a composite X-ray diffraction chart comparing the crystalline structure of the asbestoform material before and after treatment.

FIG. 2 shows the conversion rate of asbestoform material treated according to the present invention.

DETAILED DESCRIPTION OF THE INVENTION

According to the present invention, asbestoform materials are mixed with an effective amount of an alkaline flux and heated to a temperature of at least 800° C. to exchange some of the sodium or calcium ions of the flux for some of the magnesium ions of the asbestos. The heating time depends upon the temperatures and pressures used, with the time for heating depending inversely upon both temperature and pressure. For a temperature of about 800° C. at atmospheric pressure, the reaction time is approximately thirty minutes. The resulting product is either a glassy-appearing or a well-defined crystalline material, depending upon the rate of cooling of the heated mixture.

The temperature can be reduced by increasing the pressure upon the reaction zone, and the amount of flux can be varied so as to reduce the temperature required to change the crystalline structure of the asbestos.

The amount of flux used is preferably approximately a 1:1 ratio, but this can be varied along with the other reaction conditions. Since the reaction proceeds with the asbestoform material in contact with the flux, any proportion of flux with respect to asbestos which puts the asbestos into contact with the flux can be used in the present invention. It has been found, however, that at least a 1:1 weight ratio of asbestos to flux provides an optimum amount of flux at atmospheric pressure.

The reaction can be conducted in any suitable apparatus, as long as the reaction mixture is maintained such that substantially all of the asbestos is in contact with flux during the reaction. It is advantageous to operate with a slightly negative pressure over the reactor to keep asbestos from escaping into the atmosphere.

Heterogeneous or homogeneous reaction conditions can also be used, as long as there is contact between the asbestos and the flux. For example, a fixed or fluidized bed chemical reactor can be used to effect the reaction.

When the material is cooled very slowly, i.e, at less than 10°-20° C. per minute, the material has a well-defined crystal structure. More rapid cooling, while still producing a crystalline material, produces a material that has a glassy appearance. The resulting product has none of the original crystalline structure of asbestos, and therefore does not present an environmental hazard.

The expression "asbestoform material" includes relatively pure asbestos-containing materials, such as asbestos in combination with organic materials, inorganic materials, and mixtures thereof. Asbestoform materials may contain from about 0.5 to about 100% by weight of asbestos.

For convenience in handling, and to present the least impact on the environment, the asbestoform material should be maintained in a sealed environment once this material has been brought to the reactor for melting. Thus, the asbestoform material and flux are preferably conveyed to the reactor by sealed mixing and conveying means. For example, the asbestoform material from an asbestos hopper together with the alkaline flux from another hopper are fed directly into a screw conveyor, the screw conveyor in turn leading directly into a furnace.

The furnace and feed system can be operated at reduced pressure, ambient pressure, or increased pressure. However, in order to minimize emission of asbestos to the environment, the furnace and feed system are preferably operated at slightly reduced pressure.

A plant for carrying out the process of the present invention may be provided in a portable form, so that the plant can be transported to a site such as a factory or power station where there is asbestos to be disposed of, and the treatment can be carried out without transporting the asbestos from the site, which transporting inevitably involves risk to the general public. A suitable transportable reactor may have a capacity of up to about ten tons of asbestoform material per day.

Once the asbestoform material has been received, it is first pulverized if necessary to a size small enough to permit rapid melting, and then is kept in a totally enclosed storage hopper, preferably maintained under reduced pressure to prevent any asbestos particles from escaping to the atmosphere. The waste asbestos is then discharged along a screw conveyor/mixer, and the alkaline flux is then added and mixed thoroughly with the asbestos. This mixture is introduced into an electric furnace for heating to from about 700° to about 1000° C. Any gases produced by decomposition of the alkaline flux, for example, the carbonates in the trona, are vented to the air via a filter to the atmosphere by means of a fan that maintains a slightly reduced pressure. The material that is produced after heating can be cooled quickly or can be cooled at a controlled rate to form a crystalline material. The product can be disposed of as a safe, non-toxic waste, or it can form a process feed stock for forming into a variety of glassy products such as fiber insulation, blocks, bottles, vitreous enamels, and ceramic tiles.

A number of conventional alkaline fluxes can be used in the process according to the present invention. These compounds need not be used in the pure form, but can be used as complexes which are readily available for industrial use.

Barium oxide has a lesser effect on the thermal expansion of the mixture upon heating during heating than does trona. The best source of barium oxide for use as a flux is barium carbonate, and the barium carbonate can be introduced directly into the asbestoform material for heating.

Calcium oxide can be obtained from calcium carbonate, calcium borate, dolomite, calcium fluoride, better known as fluorspar; bone ash, which is refined calcium phosphate; and wollastonite, calcium silicate.

Lead oxide can also be used as an alkaline flux in the present invention, although precautions must be used in handling lead-based compounds and the products produced therewith. The sources of lead for use as an alkaline flux in the present invention include galena, lead sulfide, litharge, lead oxide; red lead, $Pb_3O_4$; white lead, $2PbCO_2.Pb(OH)_2$; lead monosilicate, the fritted lead silicate composed of approximately 16% silicon dioxide and 84% PbO; lead bisilicate, another commercially available lead silicate, with the approximate composition of 65% PbO, 33% $SiO_2$, and 2% $Al_2O_3$.

Lithium oxide can also be used as an alkaline flux in the present invention, from sources including lipidolite $LiF.KF.Al_2O_3.3SiO_2$; spodumene, $Li_2O.Al_2O_3.4SiO_3$; lithium carbonate, $Li_2CO_3$; petalite, $Li_2O.Al_2O_3.8SiO_2$; amblygonite, $2LiF.Al_2O_3.P_2O_5$.

Potassium oxide has a similar fluxing action to that of sodium. The potassium oxide can be introduced into the asbestos form material in the form of potassium carbonate, more commonly known as pearl ash: potash feldspar, $K_2O.Al_2O_3.6SiO_2$; Cornwall stone, a complex compound of variable composition, roughly similar to feldspar and including fluxes of calcium, sodium, and potassium; Carolina stone, a domestic product similar to Cornwall stone; and volcanic ash, with a ceramic formula of 0.660 $K_2O$, 0.899 $Al_2O_3$, 9.59 $SiO_2$, 0.234 $Na_2O$, 0.060 $Fe_2O_3$, 0.05 $TiO_2$, 0.096 CaO, 0.014 MgO, and plastic vitrox, including alumina and silica.

Sodium oxide can be added to the asbestoform material in the form of sodium chloride, sodium carbonate, sodium bicarbonate, borax, soda feldspar ($Na_2O.2$-

$B_2O_3.10H_2O$); cryolite, $Na_3AlF_6$; or nepheline syenite, $K_2O.3NaO.4Al_2O_3.9SiO_2$.

Sodium bicarbonate can be used, either alone or in combination with sodium carbonate as an alkaline flux in the process according to the present invention.

Borax, $Na_2O.2B_2O_3.10H_2O$, can also be used as the alkaline flux in the present invention, either alone or in combination with boric acid. Other boron compounds that can be used include colemanaite, $2CaO.3B_2O_3.5H_2O$, which is a natural hydrated calcium borate which functions as an alkaline flux in the present invention.

Other materials that can be used as alkaline fluxes include iron oxide, which can be used in the form of ferrous oxide, ferric oxide, or ferrous-ferric oxide; and magnesium carbonate.

Trona is particularly well suited to be used as an alkaline flux in the process according to the present invention, because it is readily available, and the decomposition products thereof, carbon dioxide and water, are entirely nonhazardous. Trona also has the advantage of ready availability in a form that is acceptable for use in the present invention, and it is relatively inexpensive.

There is no minimum amount of alkaline flux required in the process according to the present invention, although reaction only occurs when there is a direct contact between the alkaline flux and the asbestoform material. Therefore, it is preferred to use a mixture of approximately 1:1 by weight asbestoform material to alkaline flux.

When trona was used as the alkaline flux, the resulting products were a material of sodium-magnesium silicate composition very similar to an olivine-type mineral, as well as periclase, as shown in FIG. 1. Thus, the sodium was directly incorporated into the crystalline structure of the product formed according to the process of the present invention.

FIG. 1 shows the X-ray diffraction patterns of chrysotile asbestos before treatment according to the present invention and after treatment according to the present invention.

Experimental evidence demonstrated that the reaction between the trona and the asbestoform material began to occur at approximately 800° C. at atmospheric pressure, as shown in FIG. 2. Higher temperatures and/or higher pressures would accelerate the reaction. Additionally, higher pressures permit the reaction to occur at somewhat lower temperatures.

Any type of reactor can be used for the process according to the present invention. A rotary kiln is particularly advantageous, as it aids in providing a homogeneous mixture of the initial ingredients. For a continuous process, a fluidized-bed reactor can be used.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for converting asbestos to a nonhazardous form comprising:

mixing said asbestos with a sufficient amount of flux selected from the group consisting of trona, sodium oxide, sodium carbonate, sodium phosphate, sodium bicarbonate, borax and mixture thereof; and heating within the temperature range of about 815° to about 1000° C. until said asbestos reacts with said flux to form a different crystalline structure containing sodium.

2. The method according to claim 1 wherein said flux consists essentially of trona.

3. The method according to claim 1 wherein said asbestos further comprises selection from the group of chrysotile, crocidolite, amosite, anthophyllite, and mixtures thereof.

4. The method according to claim 3 wherein said asbestos consists essentially of chrysolite.

5. The method according to claim 1 wherein said asbestoform material and said alkaline flux further comprises a weight ratio of approximately 1:1.

6. The method according to claim 1 wherein the pressure during said heating is at about or below ambient.

* * * * *